(12) United States Patent
Meng et al.

(10) Patent No.: US 11,219,165 B1
(45) Date of Patent: Jan. 11, 2022

(54) MOTORIZED CART FOR TRANSPORTING AGRICULTURAL HARVEST CONTAINERS

(71) Applicant: VINERGY, INC., Bakersfield, CA (US)

(72) Inventors: Justin Meng, Bakersfield, CA (US); Jeffrey Shaw, Bakersfield, CA (US)

(*) Notice: Subject to any disclaimer, the term of this patent is extended or adjusted under 35 U.S.C. 154(b) by 0 days.

(21) Appl. No.: 17/067,531

(22) Filed: Oct. 9, 2020

Related U.S. Application Data

(60) Provisional application No. 62/913,090, filed on Oct. 9, 2019.

(51) Int. Cl.
| | |
|---|---|
| *A01D 93/00* | (2009.01) |
| *B60P 3/00* | (2006.01) |
| *B60L 53/16* | (2019.01) |
| *B62D 15/02* | (2006.01) |
| *B60P 3/06* | (2006.01) |
| *B60P 7/06* | (2006.01) |
| *B60P 1/43* | (2006.01) |
| *B60R 16/023* | (2006.01) |
| *B60L 53/57* | (2019.01) |
| *G05D 1/02* | (2020.01) |
| *B60P 1/64* | (2006.01) |

(52) U.S. Cl.
CPC .............. *A01D 93/00* (2013.01); *B60L 53/16* (2019.02); *B60L 53/57* (2019.02); *B60P 1/43* (2013.01); *B60P 3/00* (2013.01); *B60P 3/064* (2013.01); *B60P 7/06* (2013.01); *B60R 16/0238* (2013.01); *B62D 15/025* (2013.01); *B60P 1/6418* (2013.01); *G05D 1/0231* (2013.01); *G05D 1/0278* (2013.01)

(58) Field of Classification Search
CPC .......... A01D 93/00; B60P 1/6418; B60P 3/00; B60P 3/007
USPC ................................................. 701/41; 296/3
See application file for complete search history.

(56) References Cited

U.S. PATENT DOCUMENTS

| | | | | |
|---|---|---|---|---|
| 5,314,244 | A * | 5/1994 | Swets ................... | E05B 65/467 211/181.1 |
| 9,713,977 | B1 * | 7/2017 | Neal ..................... | B60P 1/4442 |
| 10,106,094 | B2 * | 10/2018 | Hanley .................... | B60R 7/04 |
| 2002/0030337 | A1 * | 3/2002 | Calmeise ................ | B62B 3/006 280/47.35 |
| 2015/0075880 | A1 * | 3/2015 | Grossen .................. | B60L 50/60 180/2.2 |
| 2016/0243970 | A1 * | 8/2016 | Eletrabi ............... | G05D 1/0891 |
| 2017/0158431 | A1 * | 6/2017 | Hamilton ............. | B65G 1/0492 |
| 2018/0370377 | A1 * | 12/2018 | Blacksberg .......... | G05D 1/0231 |
| 2019/0226245 | A1 * | 7/2019 | Fabre ..................... | E05B 77/48 |

(Continued)

FOREIGN PATENT DOCUMENTS

EP 3566900 A1 * 11/2019 ........... B60R 25/255

*Primary Examiner* — Hilary L Gutman
(74) *Attorney, Agent, or Firm* — R. Scott Kimsey; Klein DeNatale Goldner

(57) ABSTRACT

A lug transport includes a lower assembly having a frame with an upper end and a lower end. An upper assembly is attached to the upper end of the lower assembly. A plurality of storage spaces is defined by the upper assembly. At least one wheel is rotatably attached to the lower end of the lower assembly to allow the lug transport to travel along a surface. The storage spaces are sized and shaped to each receive an agricultural lug. The storage spaces are also configured to prevent sliding of an agricultural lug when contained within a storage space.

2 Claims, 20 Drawing Sheets

(56) References Cited

U.S. PATENT DOCUMENTS

2020/0262263 A1\* 8/2020 Doerksen ................. B62D 9/02
2020/0307397 A1\* 10/2020 Namiki ................... B60L 53/36
2021/0094506 A1\* 4/2021 Baker ................... B60R 25/241

\* cited by examiner

ABSTRACT# MOTORIZED CART FOR TRANSPORTING AGRICULTURAL HARVEST CONTAINERS

RELATED APPLICATIONS

This application claims priority of U.S. Provisional Patent Application No. 62/913,090, filed Oct. 9, 2019 and entitled "Motorized Cart for Transporting Agricultural Harvest Containers," which application is incorporated herein by reference in its entirety.

BACKGROUND AND FIELD

1. Field

The present disclosure pertains to the field of motorized carts, and specifically to motorized carts used in agricultural settings for delivery of harvested fruits and vegetables.

2. Background

Agricultural crop harvest is a labor-intensive process that has traditionally relied on manual labor to perform the bulk of the work required. In the table grape industry, for example, workers move between rows, picking fruit ready for harvest and placing the fruit into lugs, bins, or other containers. When the containers are full, they are carried to the end of the row where the fruit is combined with fruit picked by other workers. More recently, some workers have used specially-designed wheelbarrows so that individual containers do not have to be carried by hand.

Whether the containers are carried by hand or transported on wheelbarrows, substantial manual labor is still required to move the fruit out from under the canopy to the edge of the field for packing or for transport to an offsite packaging facility.

SUMMARY

A lug transport includes a lower assembly having a frame with an upper end and a lower end. An upper assembly is attached to the upper end of the lower assembly. A plurality of storage spaces is defined by the upper assembly. At least one wheel is rotatably attached to the lower end of the lower assembly to allow the lug transport to travel along a surface. The storage spaces are sized and shaped to each receive an agricultural lug. The storage spaces are also configured to prevent sliding of an agricultural lug when contained within a storage space.

The at least one wheel of the lug transport may be rotatably attached to a rear end of the lower assembly. The lug transport may also include a caster assembly attached to the front end of the lower assembly. The caster assembly may be freely rotatable about an axis perpendicular to the horizonal plane of the lower assembly.

Each storage space of the lug transport may be defined by a pair of opposing support arms, where each support arm has an upper end and a lower end. An upper track may extend from the upper end of each support arm inward toward an interior of a storage space. A lower track may extend from the lower end of each support arm inward toward an interior of a storage space.

The lug transport may include a support strip extending between opposing support arms of each respective storage space.

The upper assembly of the lug transport may include a first longitudinal side and a second longitudinal side. A first plurality of storage spaces may be defined from the first longitudinal side of the upper assembly to the longitudinal center of the upper assembly. A second plurality of storage spaces may be defined from the second longitudinal side of the upper assembly to the longitudinal center of the upper assembly. The lug transport may also include a plurality of dividers, each extending between one of the first plurality of storage spaces and one of the second plurality of storage spaces.

The lug transport may include a bottom plate extending along the longitudinal center of the upper assembly at the bottom thereof.

The bottom plate may be removably attachable to the lower assembly of the lug transport.

The lug transport may include a center strip extending along the longitudinal center of the upper assembly at the top thereof. The bottom plate of a first upper assembly may be attachable to the center support of a second upper assembly.

The first plurality of storage spaces and second plurality of storage spaces may be defined so as to extend away from the center of the upper assembly at an angle of less than ninety degrees.

The lug transport may include a battery to provide power to the lug transport.

The lug transport may include a charging connection in electrical communication with the battery. The charging connection may be configured for attachment to an electrical source for charging the battery.

The lug transport may include a GPS receiver in communication with a GPS satellite and configured to receive GPS data therefrom. A steering module may be in electronic communication with the GPS receiver and configured to receive GPS data therefrom. The steering module may be configured to determine a desired guide path of the lug transport based at least in part on the GPS data. The steering module may be configured to direct a steering system of the lug transport so that the lug transport follows the desired guide path.

The lug transport may include an electronic storage medium having navigation data stored thereon. A steering module may be in electronic communication with the electronic storage medium and configured to receive navigation data therefrom. The steering module may be configured to determine a desired guide path of the lug transport based at least in part on the navigation data. The steering module may be configured to direct a steering system of the lug transport so that the lug transport follows the desired guide path.

The lug transport may include a camera configured to receive image data from the area immediately surrounding the lug transport. A steering module may be in electronic communication with the camera and configured to receive image data therefrom. The steering module may be configured to determine a desired guide path of the lug transport based at least in part on the image data. The steering module may be configured to direct a steering system of the lug transport so that the lug transport follows the desired guide path.

The present disclosure also provides a lug transport system. The lug transport system includes a utility trailer having a deck, a ramp, first and second opposing side supports, an attachment member, and a plurality of electrical charging ports. A plurality of lug transports are disposed on the deck of the utility trailer. Each lug transport has a battery for providing power to the lug transport, and an electrical charging connection for charging the battery. The plurality of electrical charging ports are disposed along the utility trailer such that each of the plurality of lug transports can be charged simultaneously.

The plurality of charging ports may be disposed throughout the utility trailer such that the charging connector of each of the plurality of lug transports can be engaged directly with a respect charging port, without the need for cables or other connectors.

Another aspect of the disclosure provides a combination utility trailer and charging station that includes a support frame and a deck supported by the support frame. A gate is attached to one of the deck or the support frame. The gate is deployable between a first position, in which the gate extends upwardly relative to the deck, and a second position, in which the gate extends downwardly relative to the deck and forms a ramp for access to the deck. A plurality of electrical charging ports are disposed on the utility trailer such that a plurality of battery-powered vehicles can be charged simultaneously.

The combination utility trailer and charging station may also include a power distribution box and an electrical power generator in communication with the power distribution box. Each of the plurality of electrical charging ports may be in electrical communication with the power distribution box.

The plurality of electrical charging ports may be configured to mate with a charging plug on one of the plurality of battery-powered vehicles. Each of the plurality of charging ports may be disposed on the utility trailer such that each of the plurality of battery-powered vehicles may be rolled up the ramp of the utility trailer, along the deck, and into engagement with one of a plurality of electrical charging ports. The engagement between the battery-powered vehicles and the charging ports may be via an electrical cord or cable, or may be accomplished by direct engagement between a vehicle and a charging port, with no cable or cord.

DETAILED DESCRIPTION

The present disclosure provides a two-piece motorized transport or "cart" for delivery of agricultural harvest containers, and more specifically for delivery of grape harvest lugs. The disclosure also provides a trailer for charging and transporting multiple such carts.

For purposes of the present disclosure, the words "lug," "bin," and "container" may be used interchangeably to refer to various receptacles into which workers place picked or harvested fruits or vegetables. It is understood that such lugs, bins, or containers may be provided in various sizes or shapes depending on to specific use to which such lugs will be put. Further, it should be understood that directional terms such as "rear," "front," "bottom," "top," "upper," and "lower" are used for clarity and ease of description and do not imply functional properties or limitations of the devices of the present disclosure unless explicitly so-stated. The term "configured to," when used herein in reference to elements of the present disclosure, means that element is designed in such a manner as to be capable of the properties described.

Figure 1:
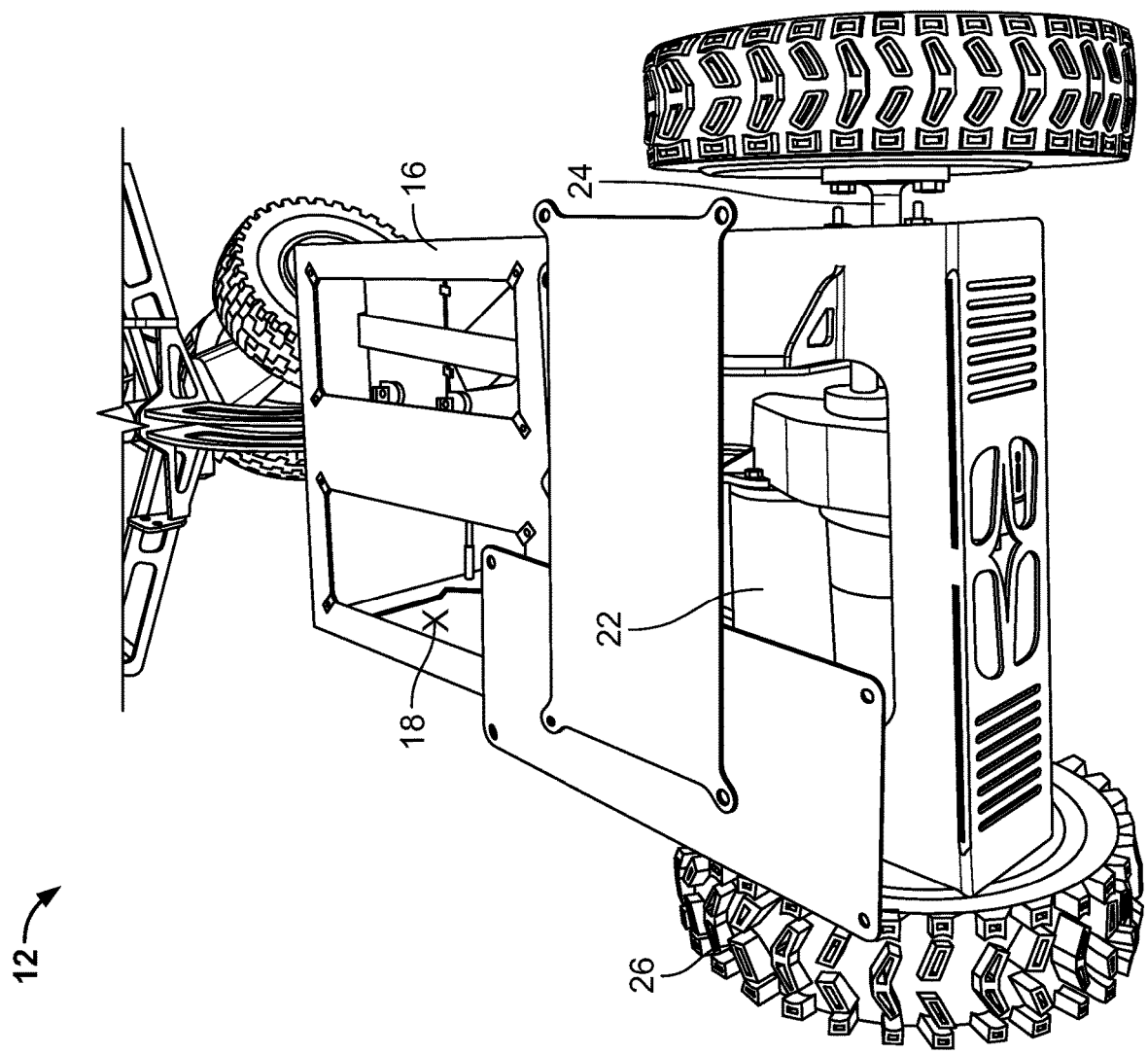
FIG. 1 is a rear view of a lower assembly of one embodiment of a lug transport of the present disclosure.
Figure 2:
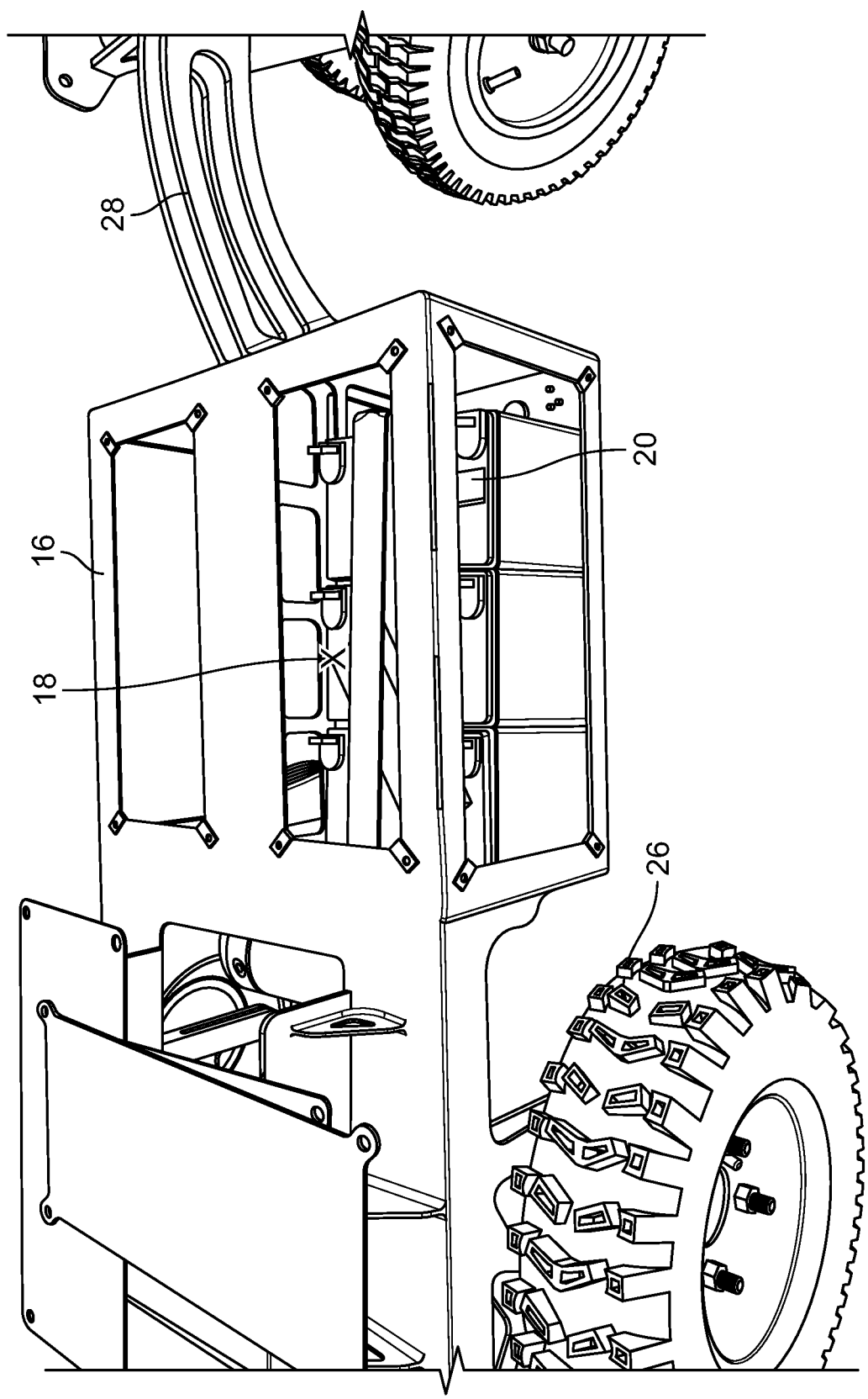
FIG. 2 is a side view of the lower assembly of FIG. 1.

A lug transport 10 of the present disclosure may be provided as two primary assemblies: a lower assembly 12 and an upper assembly 14. FIG. 1 is a rear view of an exemplary embodiment of a lower assembly 12, which is the wheeled and motorized portion of lug transport 10. FIG. 2 is a side view of the lower assembly 12 of FIG. 1.

Lower assembly 12 includes a frame 16 defining an interior space 18. Within interior space 18 are electric motor 22 and batteries 20. Other components of the device may also be contained within interior space 18 of frame 16.

A first end of frame 16 accommodates a rear axle 24 extending across a width thereof. Rear axle 24 is in rotating engagement with frame 16 and rotation of rear axle 24 is provided by electric motor 22. Wheels 26 are attached to rear axle 24 at either end of the rear axle. Rotation of rear axle 24 causes a corresponding rotation of wheels 26, thereby urging lug transport 10 to travel in the direction of travel of the wheels. It should be understood that any suitable number and arrangement of wheels may be provided with lug transport 10, and independently-powered wheels may be used instead of wheels coupled via an axle. Although pneumatic wheels are shown, any type of wheel may be used.

FIG. 2 provides a side view of the embodiment of lug transport 10 shown in FIG. 1, with some of the components referenced above also visible.

Figure 3:
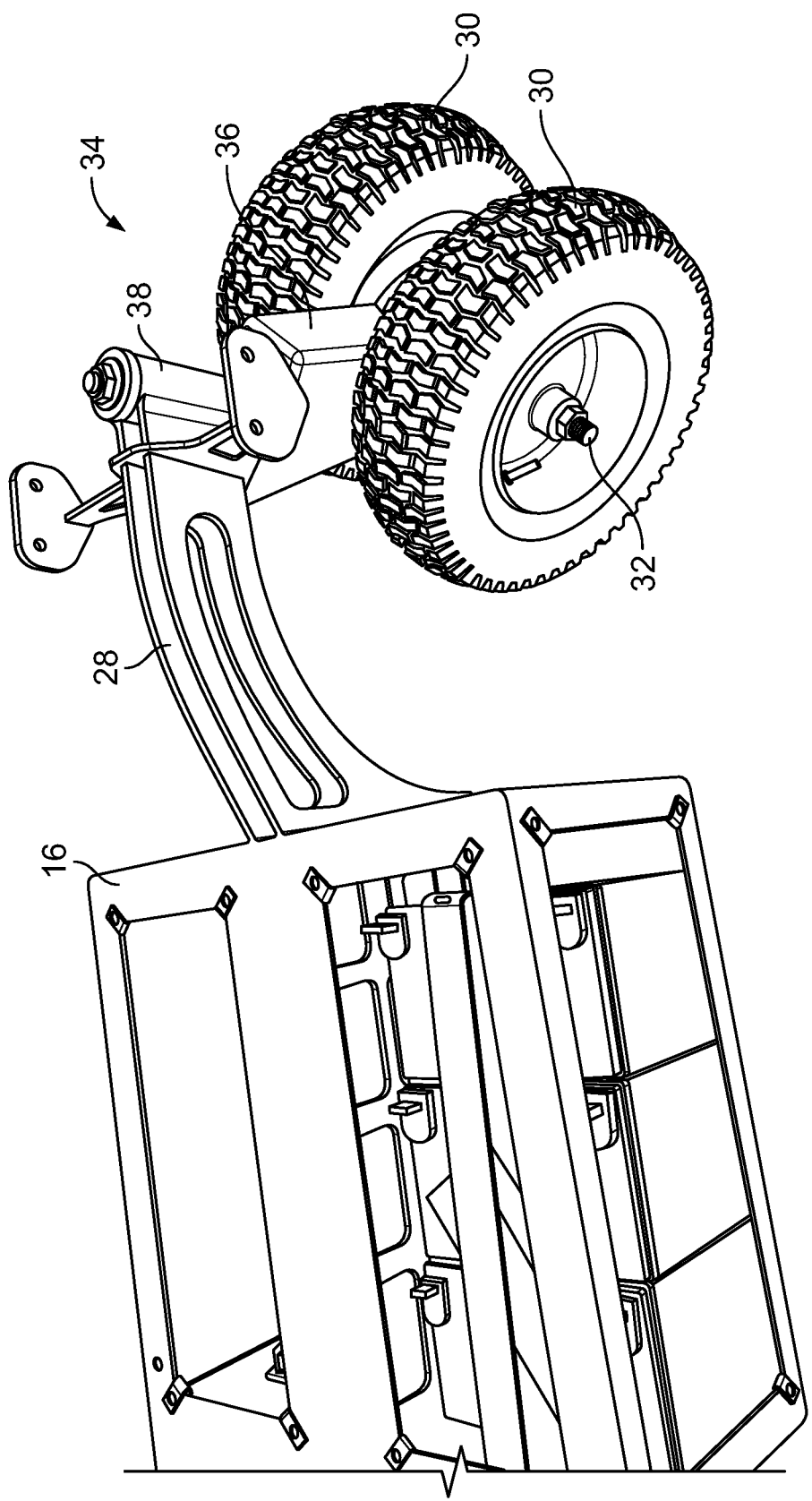
FIG. 3 is a side view of the lower assembly of FIG. 1 showing the swivel caster assembly associated therewith.

As best shown in FIG. 3, an arm 28 extends from a second end of frame 16, the arm terminating in a dual-wheel pneumatic swivel caster assembly 34. Caster assembly 34 includes a yoke 36, a front axle 32 extending through the yoke, and two front wheels 30, one attached to each opposing end of front axle 32. A stem (not shown) extends from yoke 36 and is securely held within sleeve 38 and capable of rotation within the sleeve. Yoke 36 and wheels 30 rotate freely with the rotation of the stem within sleeve 38. This free rotation action allows steering of lug transport 10.

Figure 4:
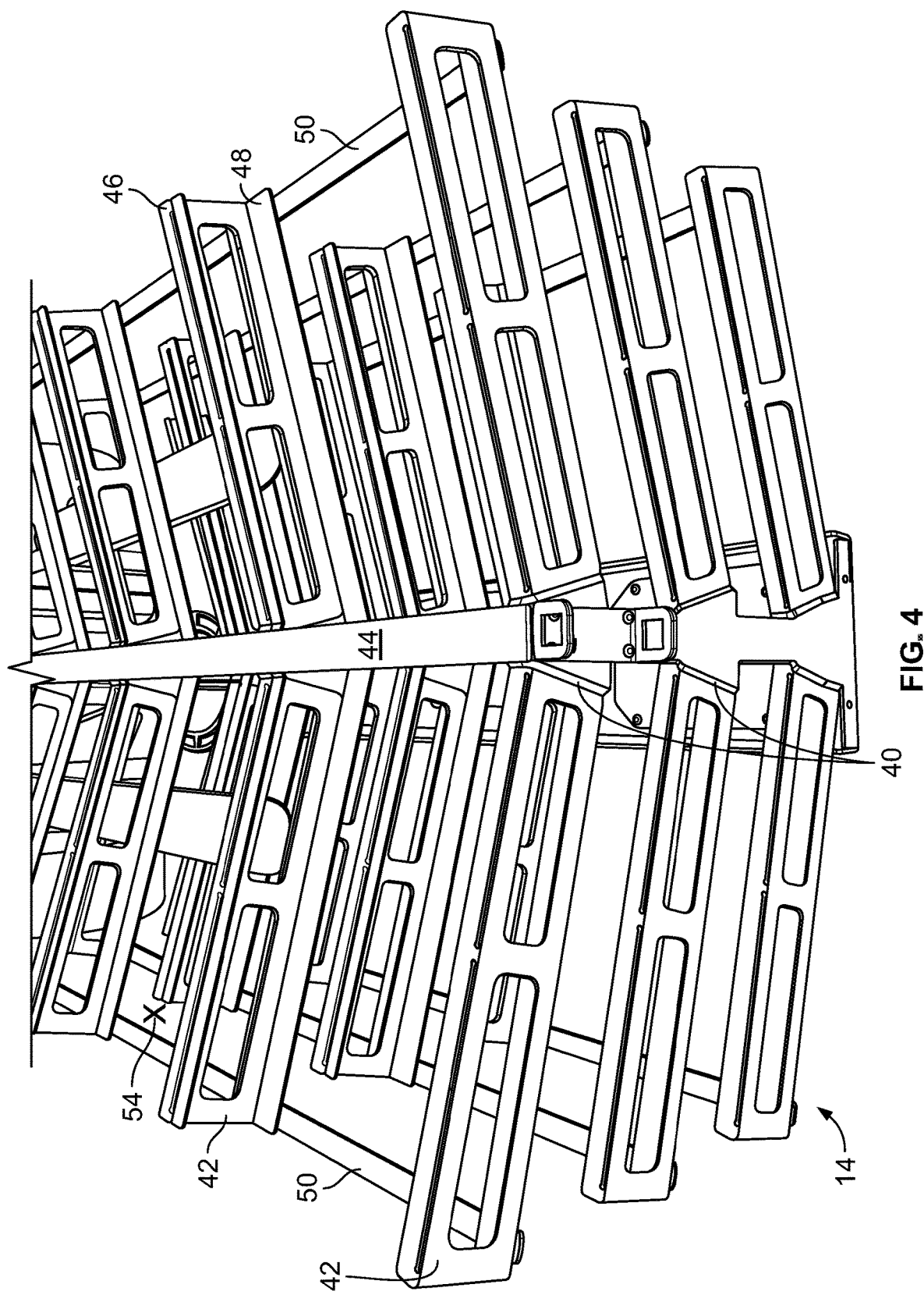
FIG. 4 is a front view of an upper assembly 14 of one embodiment of a lug transport of the present disclosure.

FIG. 4 depicts an exemplary embodiment of an upper assembly 14 of lug transport 10. Upper assembly 14 includes one or more tiers of support assemblies 40. Each support assembly 40 includes a plurality of support arms 42 extending away from a central support 44. Central support 44 extends centrally along the length of upper assembly 14. A bottom plate 43 provides for attachment of upper assembly 14 to lower assembly 12.

Support arms 42 preferably extend away from central support 44 at upward angles. The precise angle may vary depending on the design of a specific upper assembly 14 and the use to which a given lug transport 10 will be put.

Each of support arms 42 preferably include an upper track 46 and a lower track 48, the tracks extending away from the respective support arm into a transport and storage space 54 defined by each set of support arms 42, the tracks 46 and 48, central support 44, and lower support strips 50 and 56. Transport and storage spaces 54 on opposing sides of upper assembly 14 are separated by dividers 52, best shown in FIG. 5.

The number, dimensions, and angle of tilt of the transport and storage spaces 54 defined by the various components described above may vary depending on the specific lugs, bins, or other containers being transported by lug transport 10. Upper assemblies 14 are preferably configured to be readily attachable to, and detachable from, the top surface of a lower assembly 12. An agricultural lug containing fruits, vegetables, or other agricultural products may be disposed in each of the storage spaces 54. Some embodiments of lug transport 10 may include straps, stops, bands, ties, or other structures to secure agricultural lugs within the storage spaces defined in the upper assembly 14.

Figure 5:
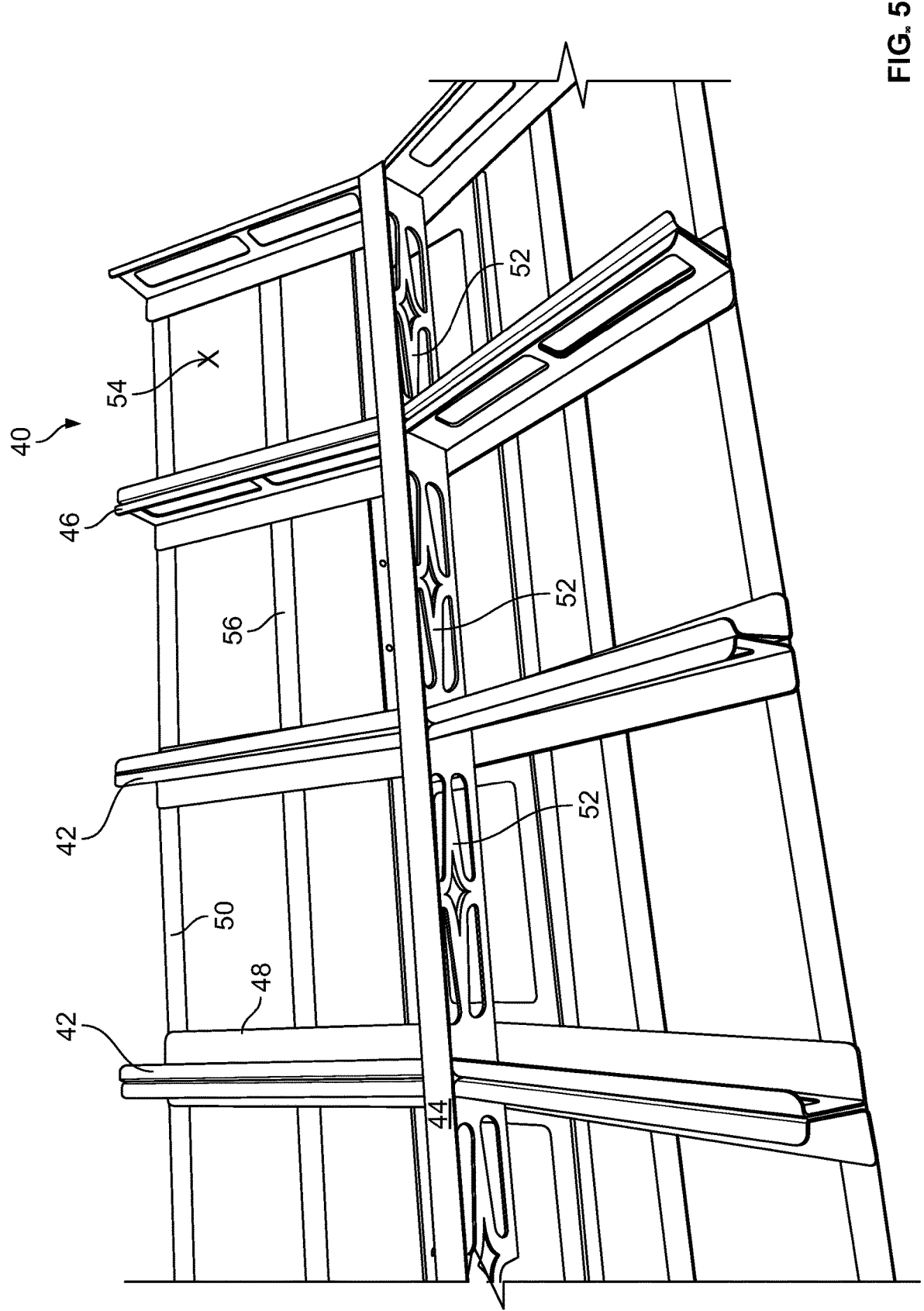
FIG. 5 is a side view of the upper assembly of FIG. 4.

FIG. 5 shows an exemplary embodiment of a single support assembly 40, which may serve as a tier on an upper assembly 14 of lug transport 10. Support strips 50 and 56 are shown, as are tracks 46 and 48. Dividers 52 are also visible. It is contemplated that any suitable number, shape, or disposition of supports and dividers may be utilized, including multiple sizes and/or shapes in the same support assembly 40. In some embodiments of lug transport 10, a support assembly 40 may have an entirely solid lower surface formed from a sheet of metal or other material rather than supports, and the side ends of such sheet of material may serve the same function as tracks 46 and 48. The dividers and walls in some embodiments of lug transport 10 may also be constructed from a solid sheet of material with no openings therein. In such embodiments, storage space 54 may be entirely enclosed on four ends, with the bottom sheet of material of one support assembly forming the top of the enclosure of the support assembly immediately beneath. The uppermost support assembly 40 may, optionally, include an upper sheet so that the respective storage space 54 remains enclosed on four sides.

Figure 6:
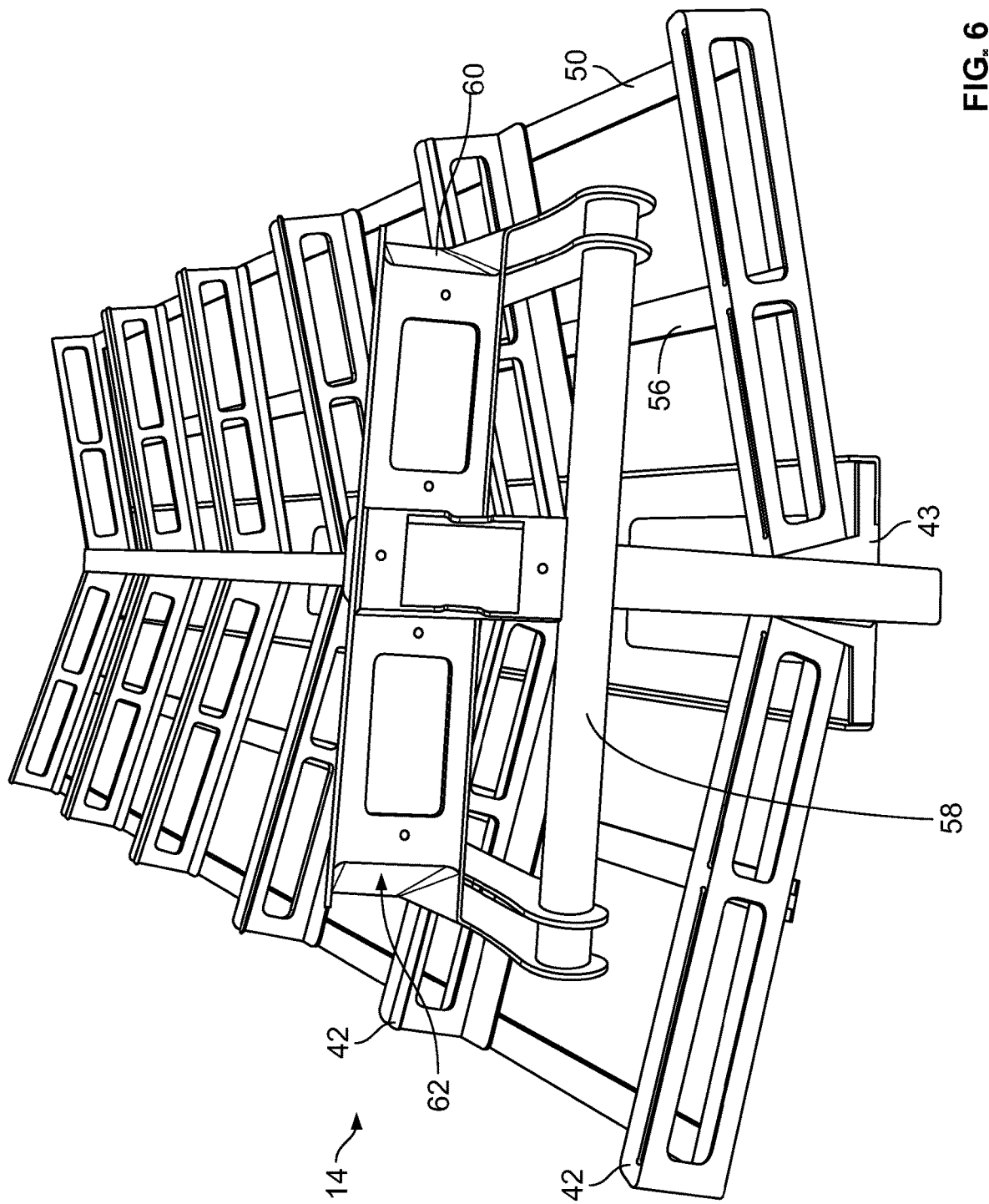
FIG. 6 is a rear view of an alternative embodiment of an upper assembly of the present disclosure.

FIG. 6 is a rear view of an upper assembly 14 having a single tiered support assembly 40. In addition to the components described above, also shown is control assembly 62, which includes a handle 58 for operator steering of lug transport 10 and a panel housing 60 for housing various controls or displays that may be associated with the device. Upper assembly 14 may be removably attached to lower assembly 12 such that the type (size, shape, angle, and the like) of upper assembly used with a given lower assembly may be readily changed. Alternatively, upper assembly 14 may be fixedly attached to lower assembly 12. Further, a plurality of upper assemblies 14 may be removably or fixedly attached to one another in a stackable fashion (e.g. bottom plate 43 of one upper assembly to central support 44 of the upper assembly immediately below) to increase the capacity of lug transport 10. The types of upper assemblies 14 so stacked may be varied to allow capacity for a variety of types of agricultural lugs on a single lug transport 10. Various methods and structures of fixed and removable attachments are known in the art, and any suitable attachment mechanism may be utilized.

Figure 7:
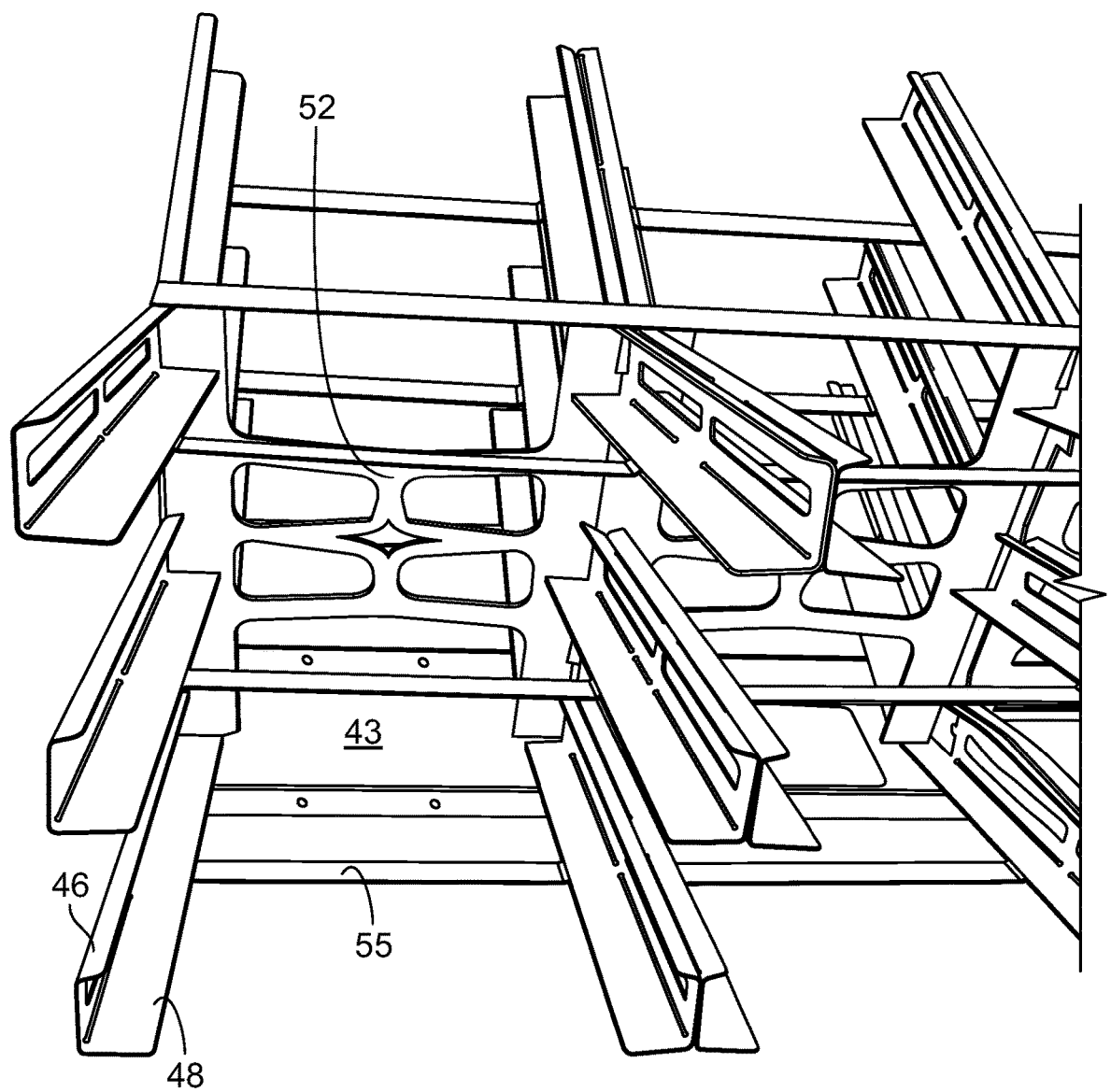
FIG. 7 is a side view of a portion of an upper assembly of the present disclosure showing a plurality of storage spaces defined therein.

FIG. 7 is a side view of a portion of an upper assembly 14. Various components of the assembly described above are shown in the drawing, such as dividers 52, bottom plate 43, tracks 46 and 48, and a single support strip 55. The figure provides a view of storage spaces 54 defined by the structure of the illustrated embodiment of upper assembly 14.

Figure 8:
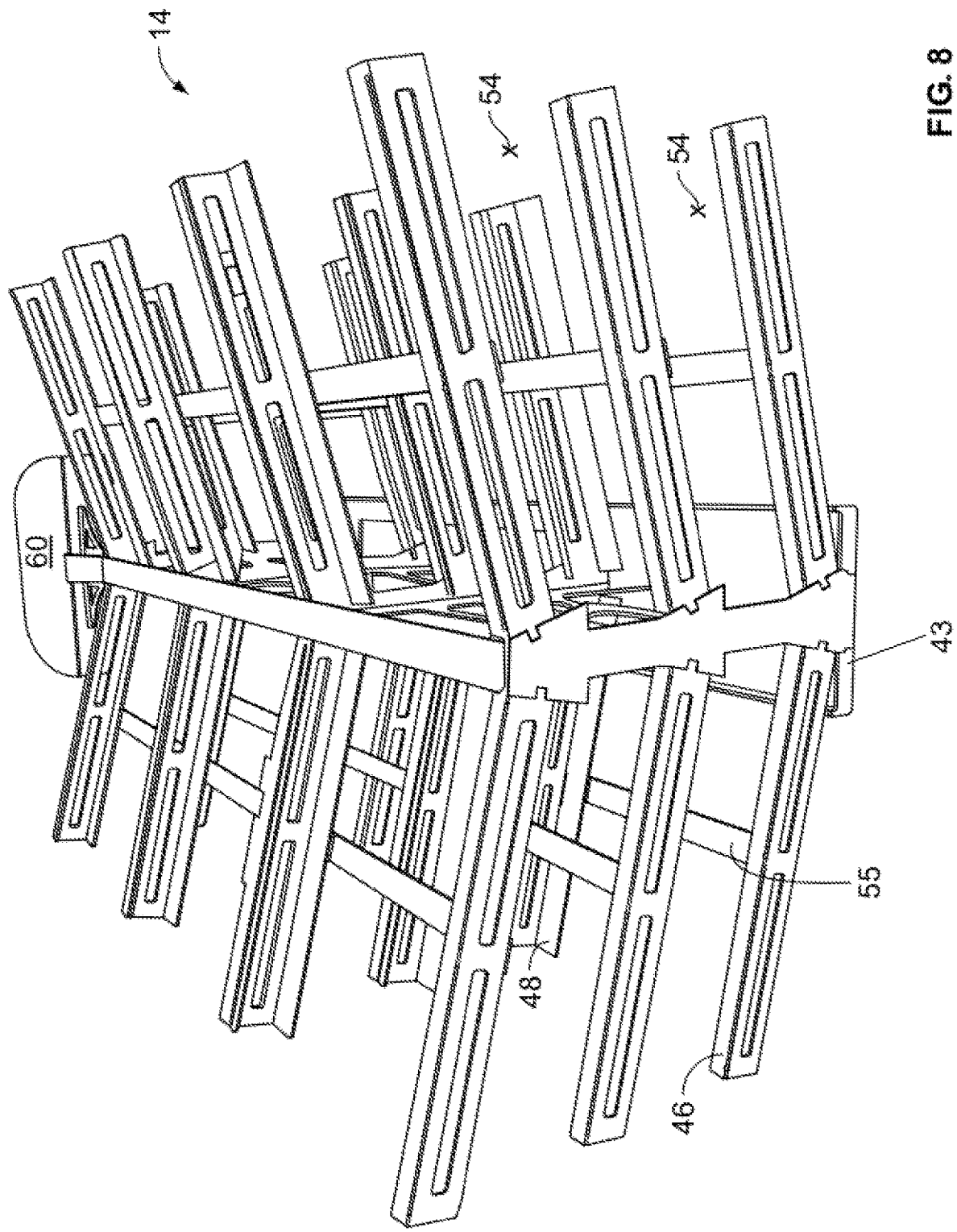
FIG. 8 is a single, multi-tiered upper assembly of the present disclosure.
Figure 9:
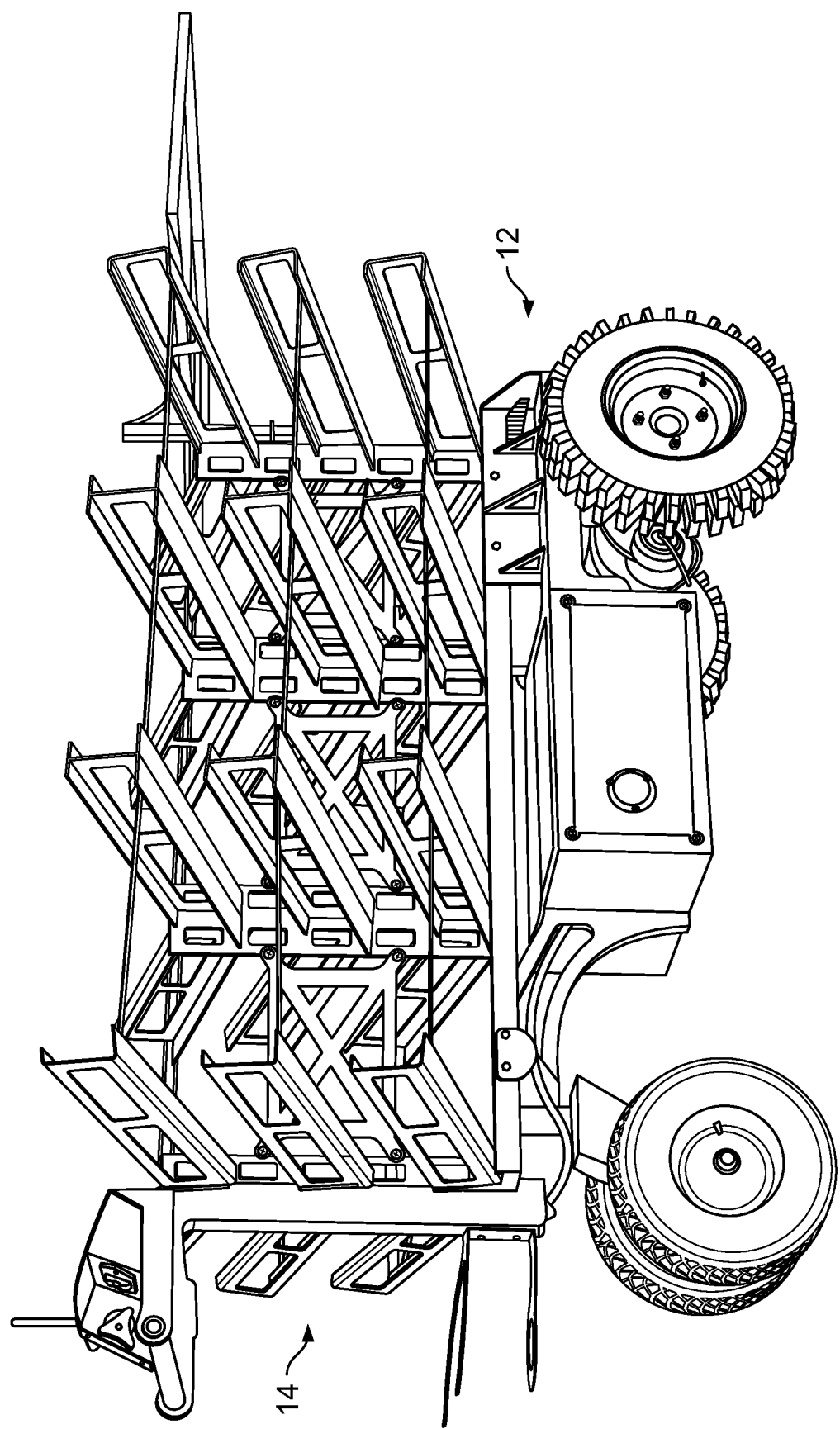
FIG. 9 depicts one embodiment of a transport lug of the present disclosure.

FIG. 8 is a front perspective view of an embodiment of an upper assembly 14 that is structured as a single, multi-tiered assembly with multiple layers of storage spaces 54 defined therein. Such an upper assembly may be fixedly or removably attached to a lower assembly 12 of a lug transport 10. FIG. 9 is an illustration of one embodiment of a completed lug transport 10 having an upper assembly as shown in FIG. 8 fixedly attached as part thereof.

Figure 10:
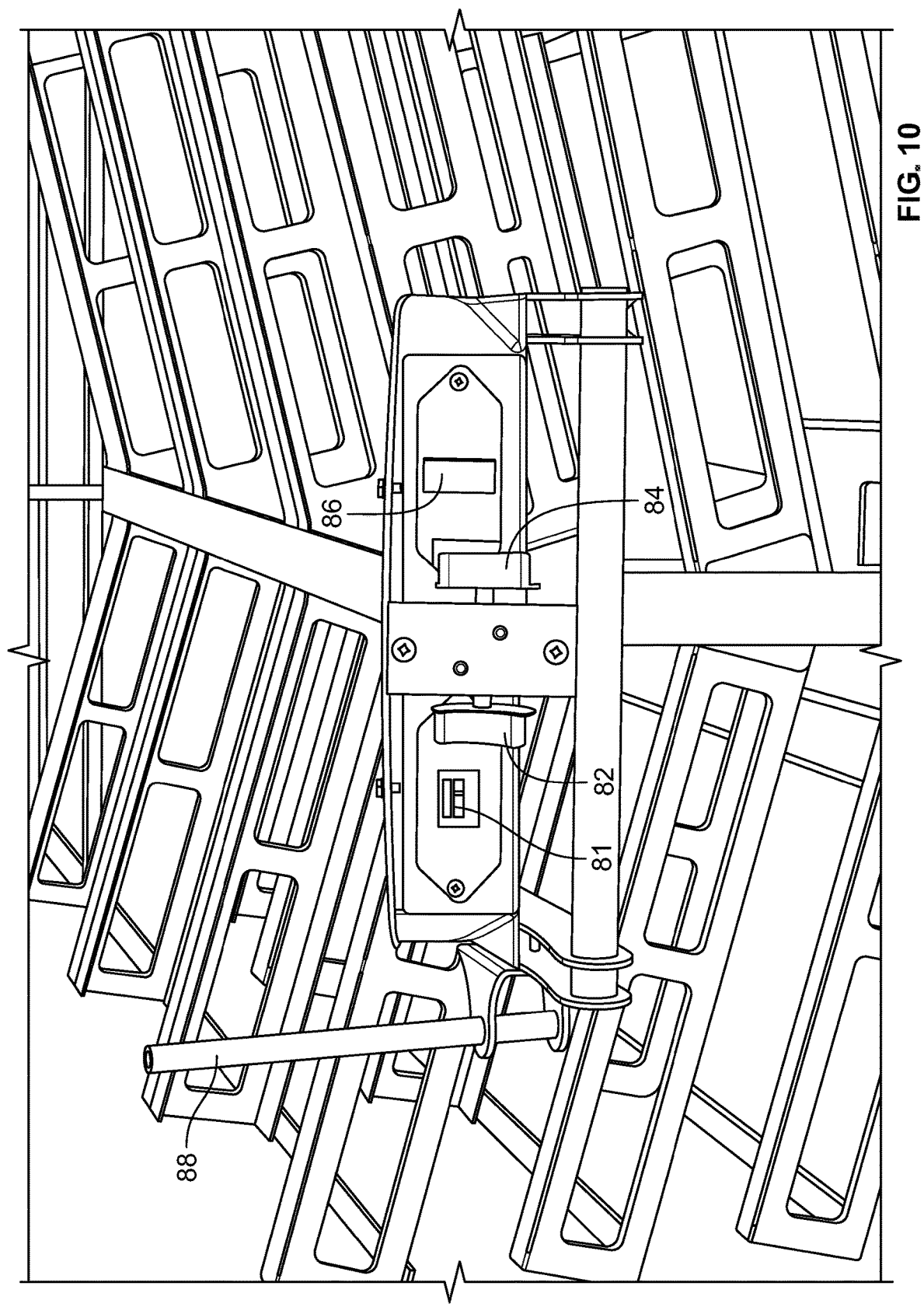
FIG. 10 depicts one embodiment of a control assembly of a lug transport of the present disclosure.
Figure 11:
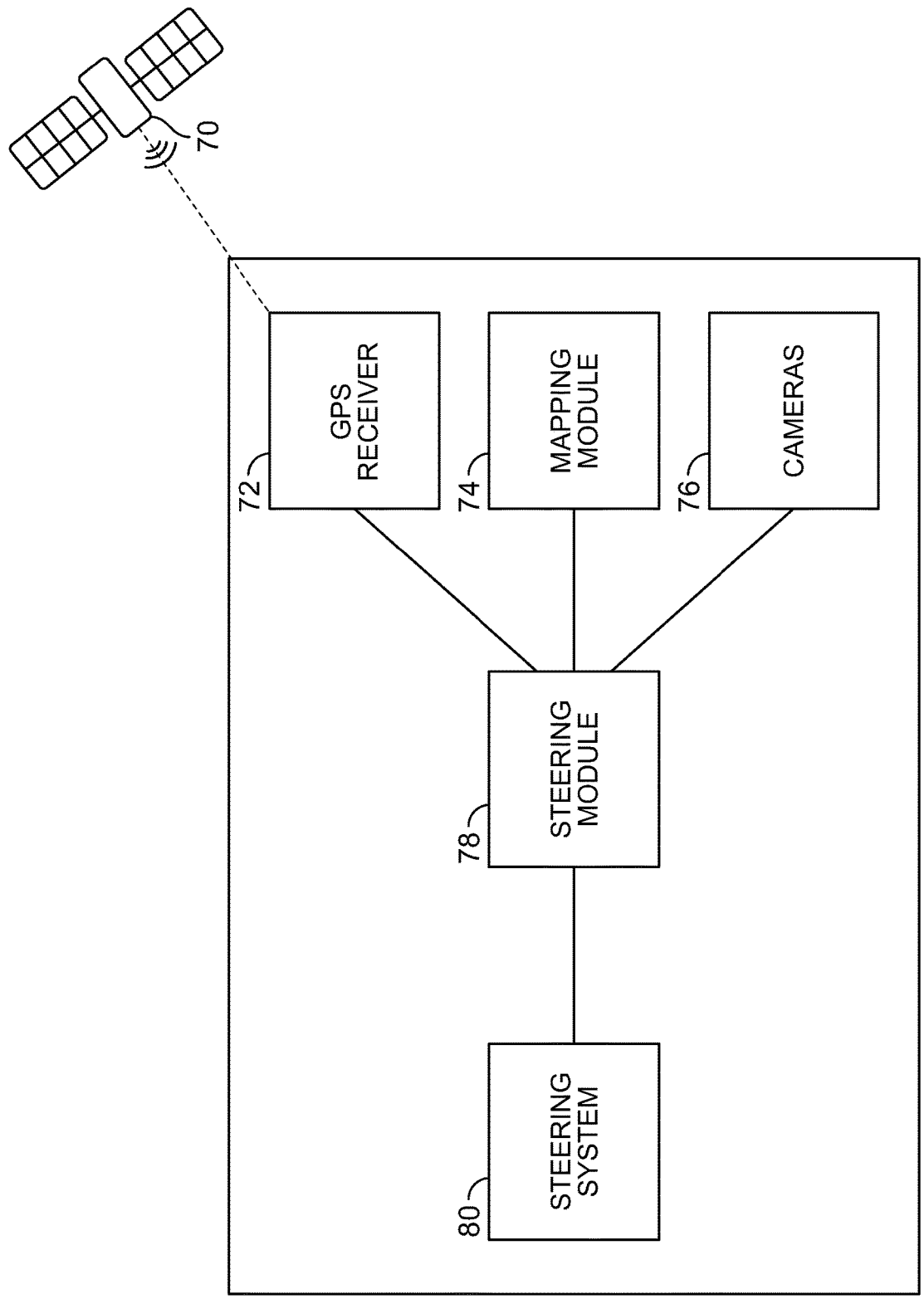
FIG. 11 is a schematic of one embodiment of a lug transport of the present invention that is capable of automated guidance.

FIG. 10 is a close view of control assembly 62. Shown are batter life indicator 81, on/off switch 86, left throttle 82, right throttle 84, and mount 88, which may be used to mechanically mount a covering or other desired object to this portion of lug transport 10.

In operation, lug transport 10 is transported into a field where fruits or vegetables are being harvested. The lug transport is preferably configured for the specific harvest in which it is being utilized. In the case of a grape harvest, for example, the lug transport may travel between the rows of grapes. As workers harvest the grapes from the vine and fruit is placed into grape lugs for transport, the lugs may be placed into the transport and storage spaces defined in the upper assembly of the lug transport. Once the lug transport has as many grape lugs as can be held, or as many as are available or desired, the lug transport travels to the end of the row so that the grape lugs can be removed and the fruit contained therein gathered for bagging or other transport or storage.

The embodiment of lug transport 10 shown in the figures is a motorized embodiment of the device. The device may be controlled by relatively simple controls allowing movement forward and in reverse, braking, locking, and the like. The device is steered by movement of the handle assembly. It is contemplated, however, that some embodiments of the device of the present disclosure may be operated manually, such as by pushing or pulling by one or more operators. Other embodiments may not only be motorized but may be fully automated, traveling between rows and to the edge of rows via GPS, light detector and ranging (lidar), or other navigation.

Motorized embodiments of the lug transport of the present disclosure are powered by one or more batteries associated therewith. It is desirable that the lug transports be easily chargeable when in the field rather than having to be returned to a central location for charging.

Some embodiments of lug transport 10 may be steerable and guidable through a field by automated means in reliance on data received, for example, from a GPS satellite. With reference to FIG. 7, lug transport 10 may include a GPS receiver 72 in communication with a GPS satellite 70 (or in communication with a ground-based reference transmitter, or a combination of such transmitters and satellites). Although one GPS receiver is shown in the figure, and embodiments of lug transport 10 may use a single GPS receiver, it is contemplated that some embodiments of lug transport 10 may employ two or more GPS receivers.

Information received via the GPS receiver may be transmitted to a steering control module that includes a microprocessor. The steering control module uses the GPS data to determine the desired path of lug transport 10. The steering control module acts via a steering system 80 of lug transport 10 to direct the path of the device. The types of steering systems subject to control by steering control module 78 are known in the art and may include hydrostatic systems or purely mechanical systems.

Also shown in FIG. 10 are mapping module 74 and cameras 76, which are other sources of data that lug transport 10 may use for automated navigation. These data sources may each be used alone or in any combination, including in combination with GPS receiver 72. Mapping module 74 may include electronic storage means wherein data or maps regarding the areas in which lug transport 10 is being used can be stored. Steering module 78 may incorporate such data into algorithms for generating instructions to be sent to steering system 80. One or more cameras 76 may be mounted on lug transport 10 to provide direct, real-time imaging of the area immediately around lug transport 10 as it travels through a field, along a crop row, or other area. Steering module 78 may utilize data from the camera(s) 76 in generating instructions to steering system 80.

Figure 12:
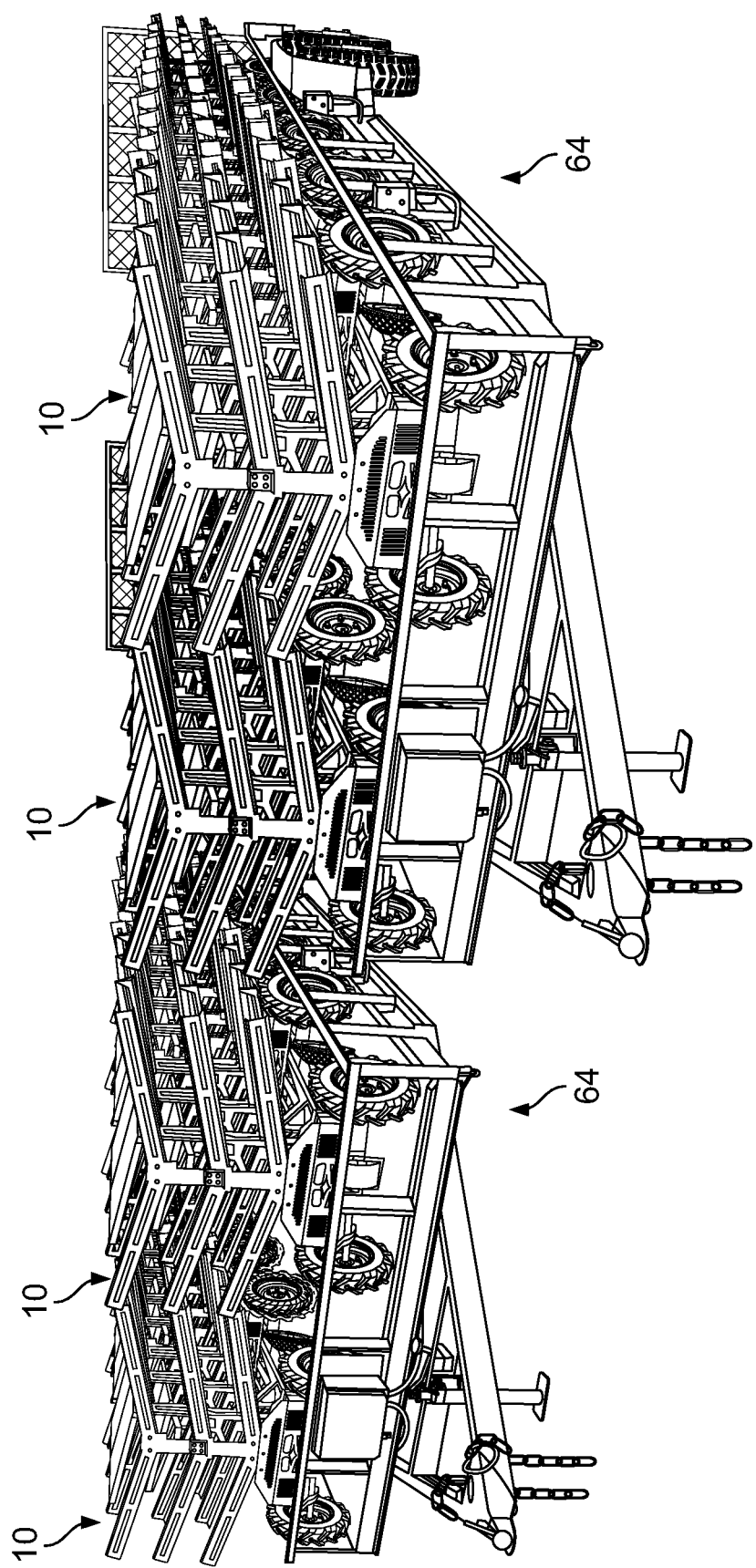
FIG. 12 depicts one embodiment of a harvest transport system of the present disclosure.
Figure 13:
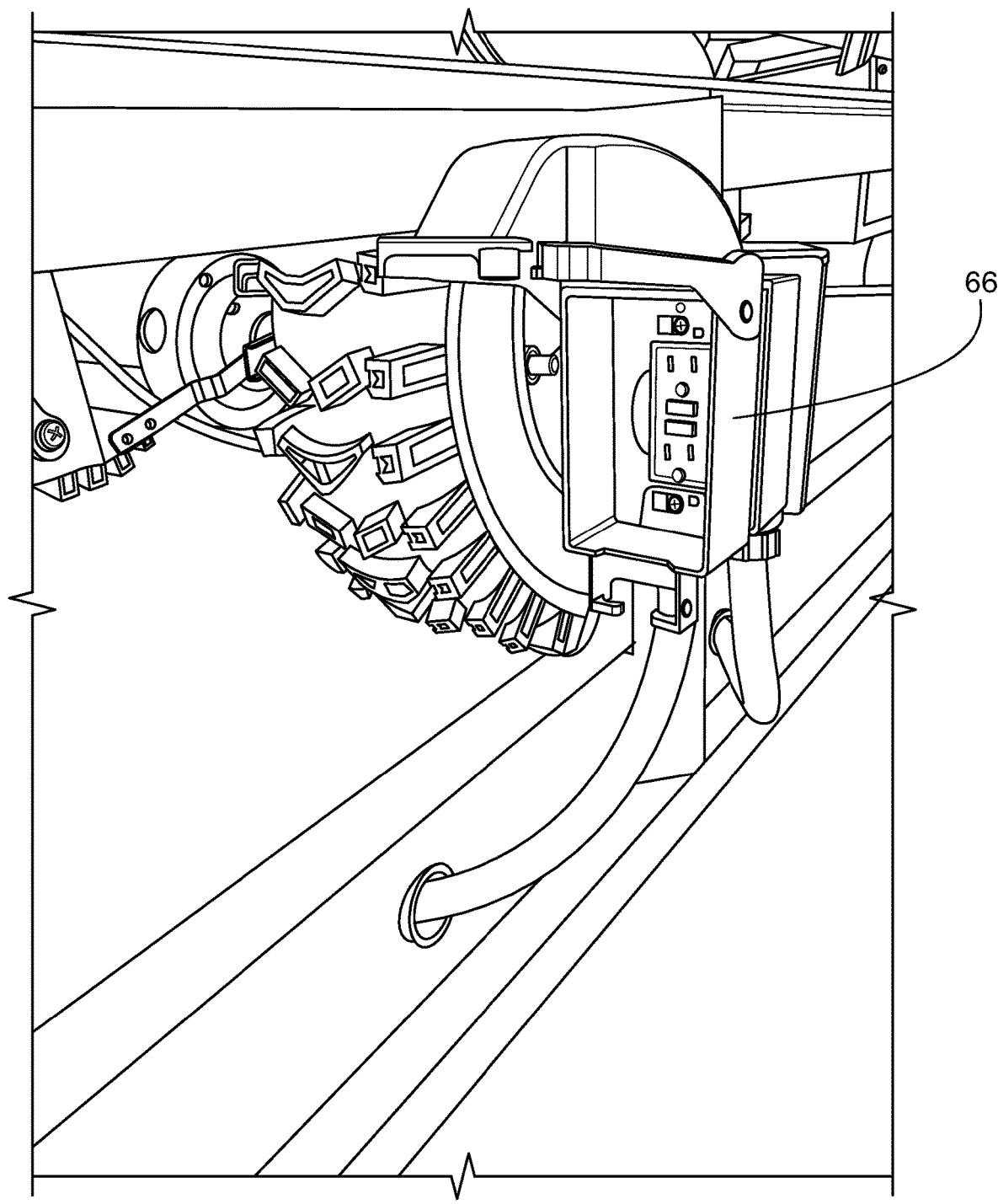
FIG. 13 is a close view of a charging port of a trailer of the present disclosure.
Figure 14:
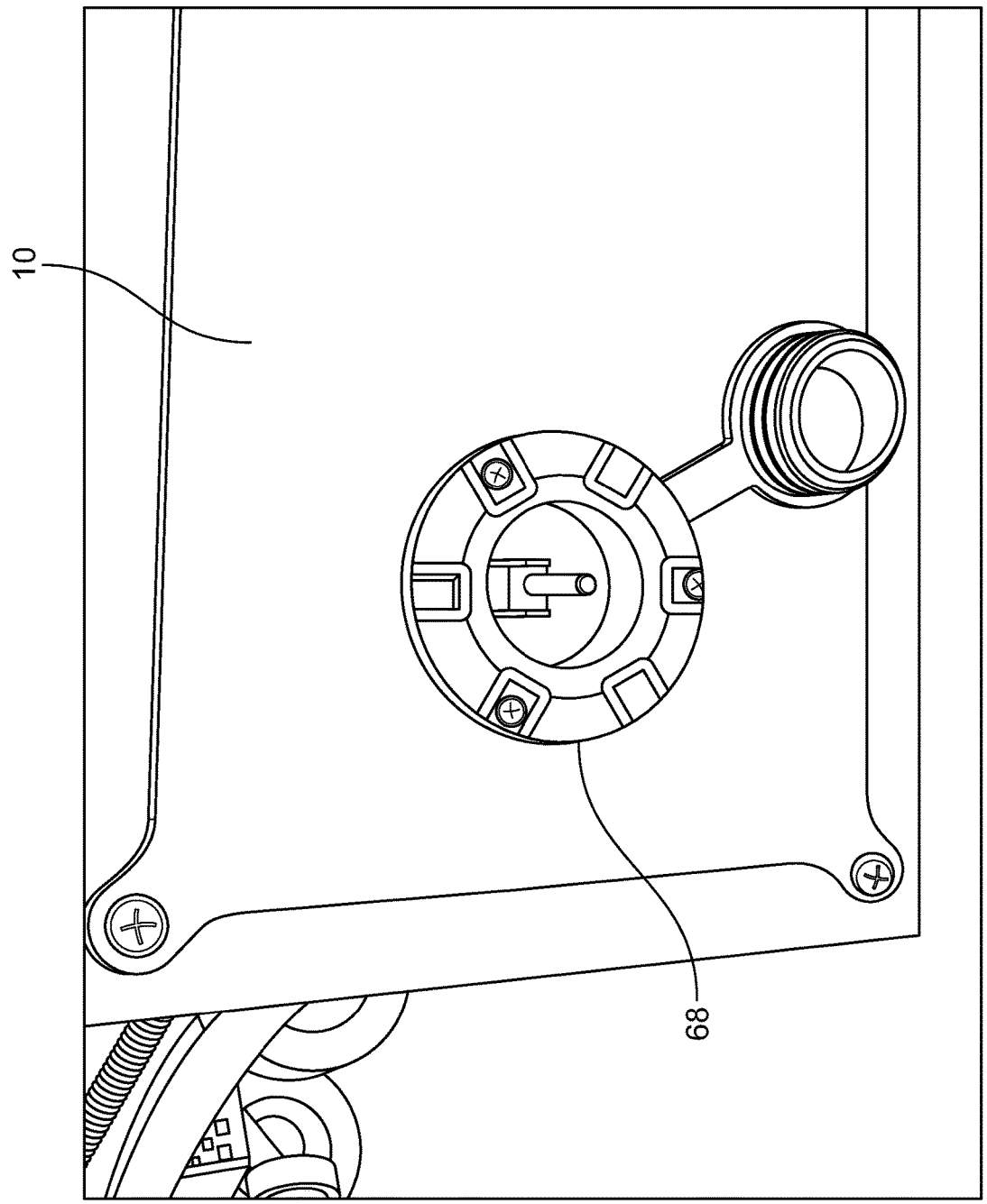
FIG. 14 is a close view of a charging connector of a lug transport of the present disclosure.
Figure 15:
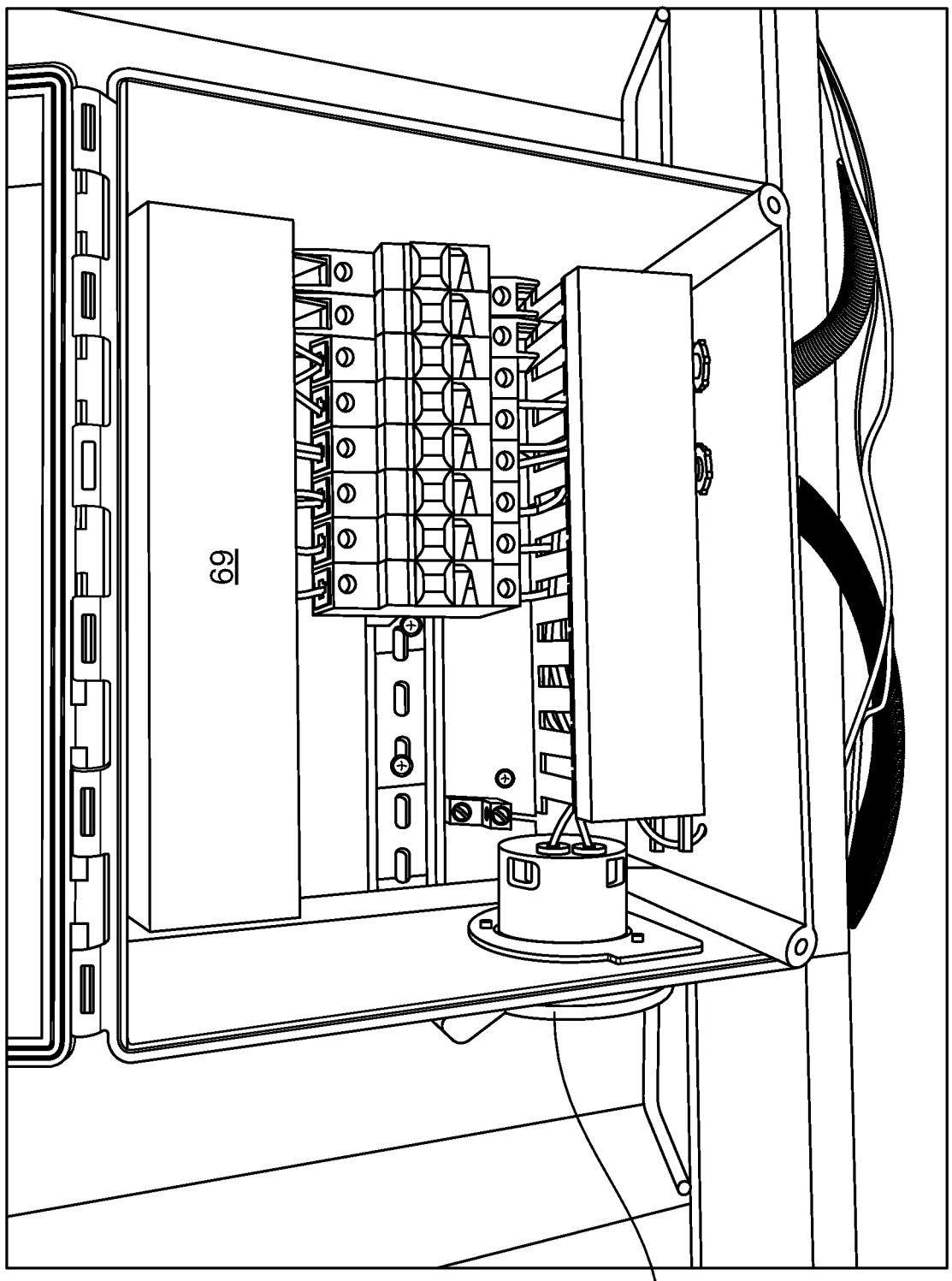
FIG. 15 is a close view of a power distribution box of a utility trailer of the present disclosure.

FIG. 12 shows one embodiment of a utility trailer 64 suitable for use in transporting multiple lug transports 10. Utility trailer 64 is preferably configured to receive multiple lug transports (e.g. 6, 8, 10, or 12 transports) and provides a plurality of charging ports 66. A close view of one such port 66 is shown in FIG. 13. Power may be provided from trailer 64 to a lug transport via connection 68 in a lug transport, shown in FIG. 14. FIG. 15 shows a power distribution box 69, known in the art, with breakers associated with a lug transport of the present disclosure. Also shown is a plug 65 that allows for delivery of power to simultaneously charge the battery of one or more lug transports on the utility trailer. A utility trailer 64 may be designed to carry any desired number of lug transports.

The configuration of trailer 64 is such that lug transports 10 align in the space provided to retain them and are easily transported as a group. When properly aligned on utility trailer 64, each lug transport is positioned to readily engage a charging port.

It is further contemplated that a utility trailer and associated lug transports may be provided as a harvest transport system. A trailer may be provided with 6, 8, 10, 12, or any other suitable number of lug transports disposed thereon and may be delivered to a customer at a business location, a harvest site, or any other desired location. The combined system—lug transports and trailers—may then be positioned properly near a harvest site and the individual lug transports unloaded and moved into the fields for transport of harvested fruits or vegetables.

The arrangement of ports 66 on utility trailer 64 is preferably such that a plurality of transports 10 is capable of being charged simultaneously, whether utility trailer 64 is stationary or in motion (i.e. being pulled behind a truck or other vehicle). In some embodiments of the harvest transport system, ports 66 and connections 68 may be configured such that a lug transport 10 can be steered or driven directly into engagement with such port, either manually or automatically, and may be disengaged in a like manner, without any need to manipulate electrical cables to attach the two.

Figure 16:
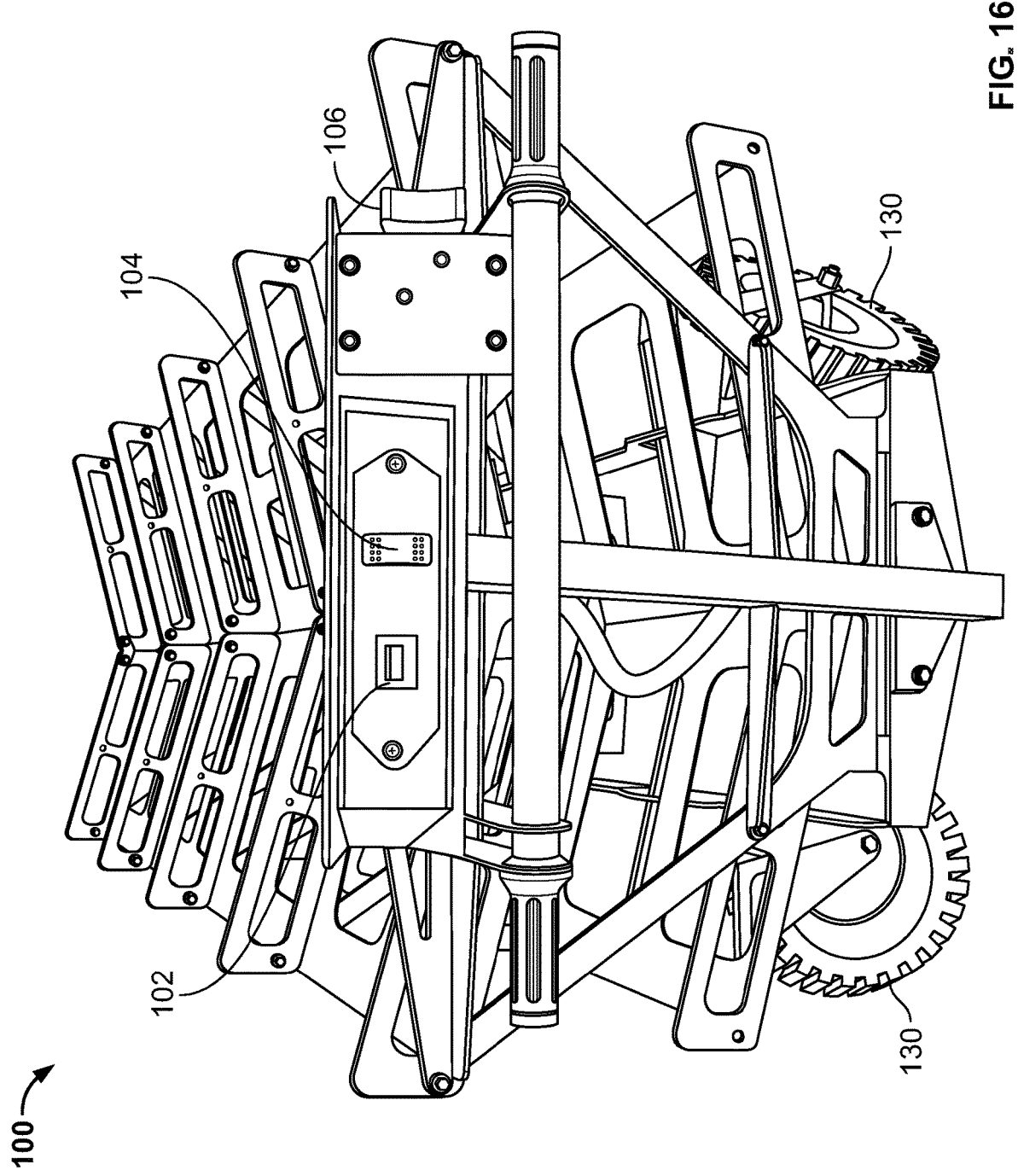
FIG. 16 is a perspective view of an alternative lug transport of the present disclosure.

FIG. 16 depicts an alternative lug transport 100 of the present disclosure. Lug transport 100 is shown from the perspective of an operator thereof. One embodiment of a control panel is shown. Battery life indicator 102, on/off switch 104, and throttle 106 are indicated.

Figure 17:
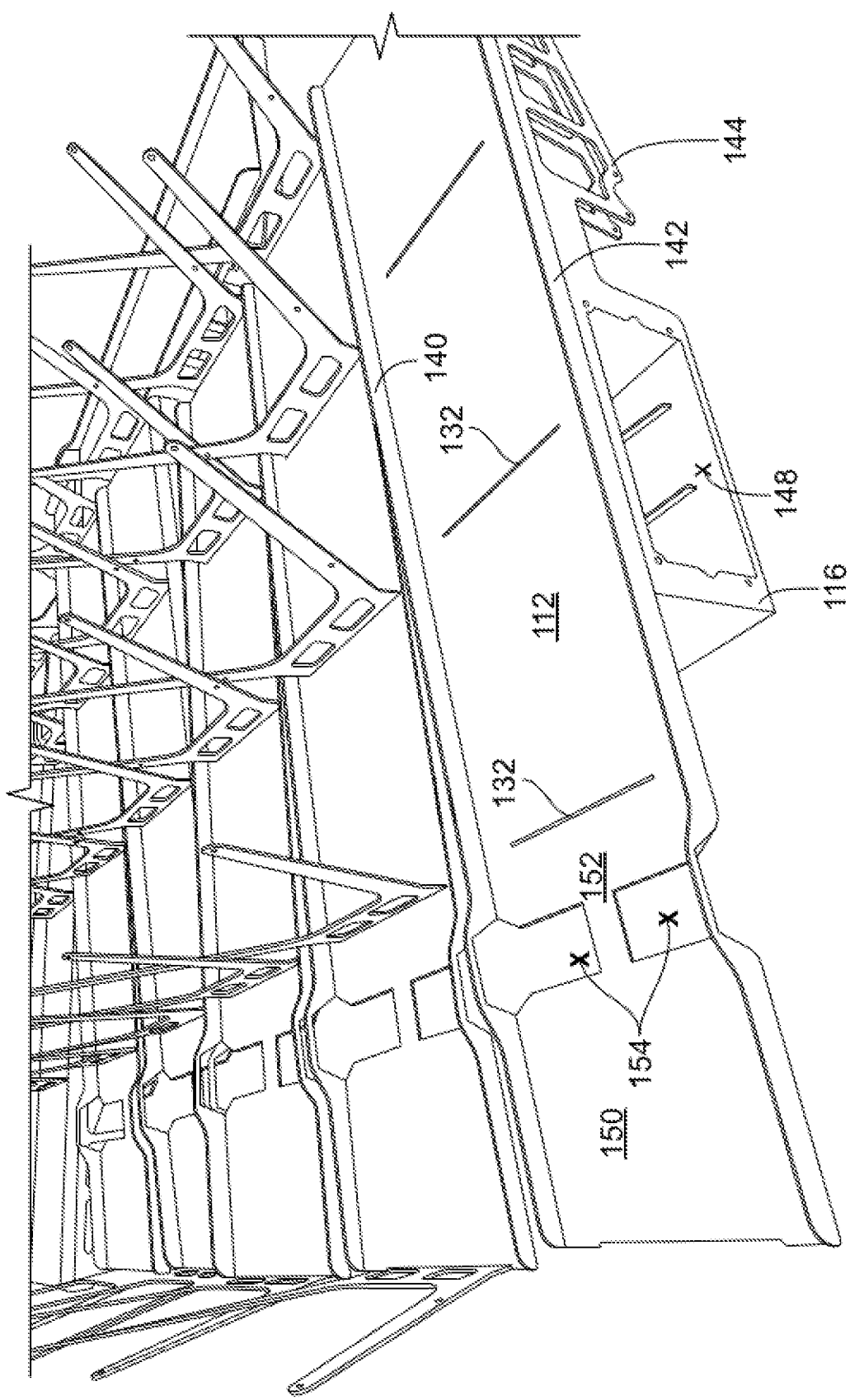
FIG. 17 is a perspective view of a lower assembly of the lug transport of FIG. 16.
Figure 19:
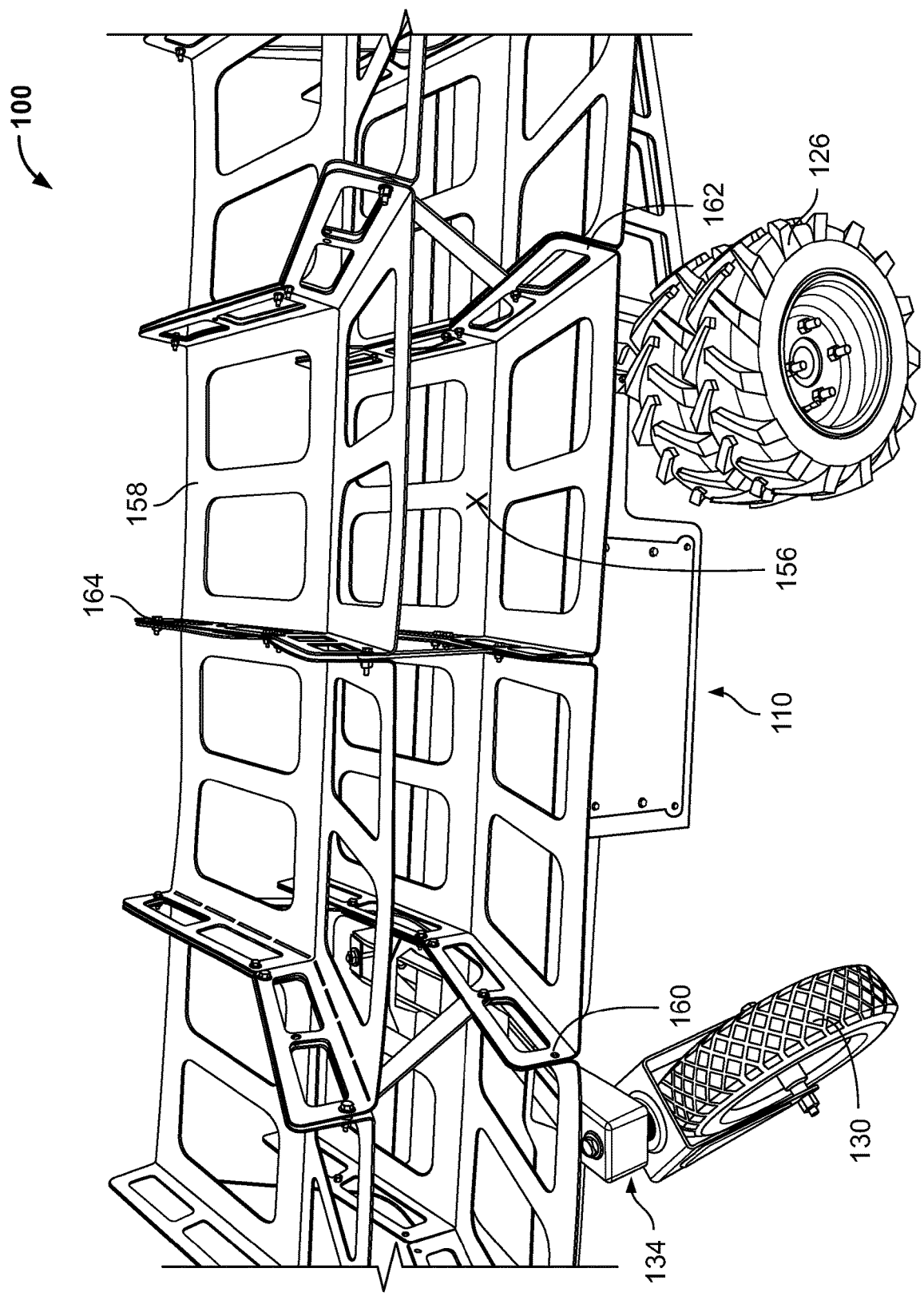
FIG. 19 is a side perspective view of the lug transport of FIG. 16.

FIG. 17 depicts a lower assembly 110 of lug transport 100, which may include any suitable number and type of wheels 126 affixed thereto, including two caster assemblies 134 and accompanying wheels 130 as best shown in FIG. 19. Wheels 126 and 130 may be pneumatic, for example. Lower assembly 110 includes a lower platform 112 having a frame 116 attached thereto that defines an interior space 148, the frame providing structure for rotating attachment of first and second pairs of wheels 130. Interior space 148 may house an electric motor and battery (not shown) as described with respect to lug transport 10, above. Support truss 144 may be provided extending downward from lower platform 112, and a second supporting truss (not shown) may be provided extending downward from an opposing side of lower platform 112. An axle supporting wheels 126 may extend between the two supporting trusses and be rotatably engaged therewith. Lower platform 112 may define a plurality of slots 132, each configured to receive structural support members 135 therein. A first end of lower assembly 110 may include a second, smaller platform 150 attached to lower platform 112 by a bridge 152. Flanking bridge 152 are two cutouts 154.

Figure 18:
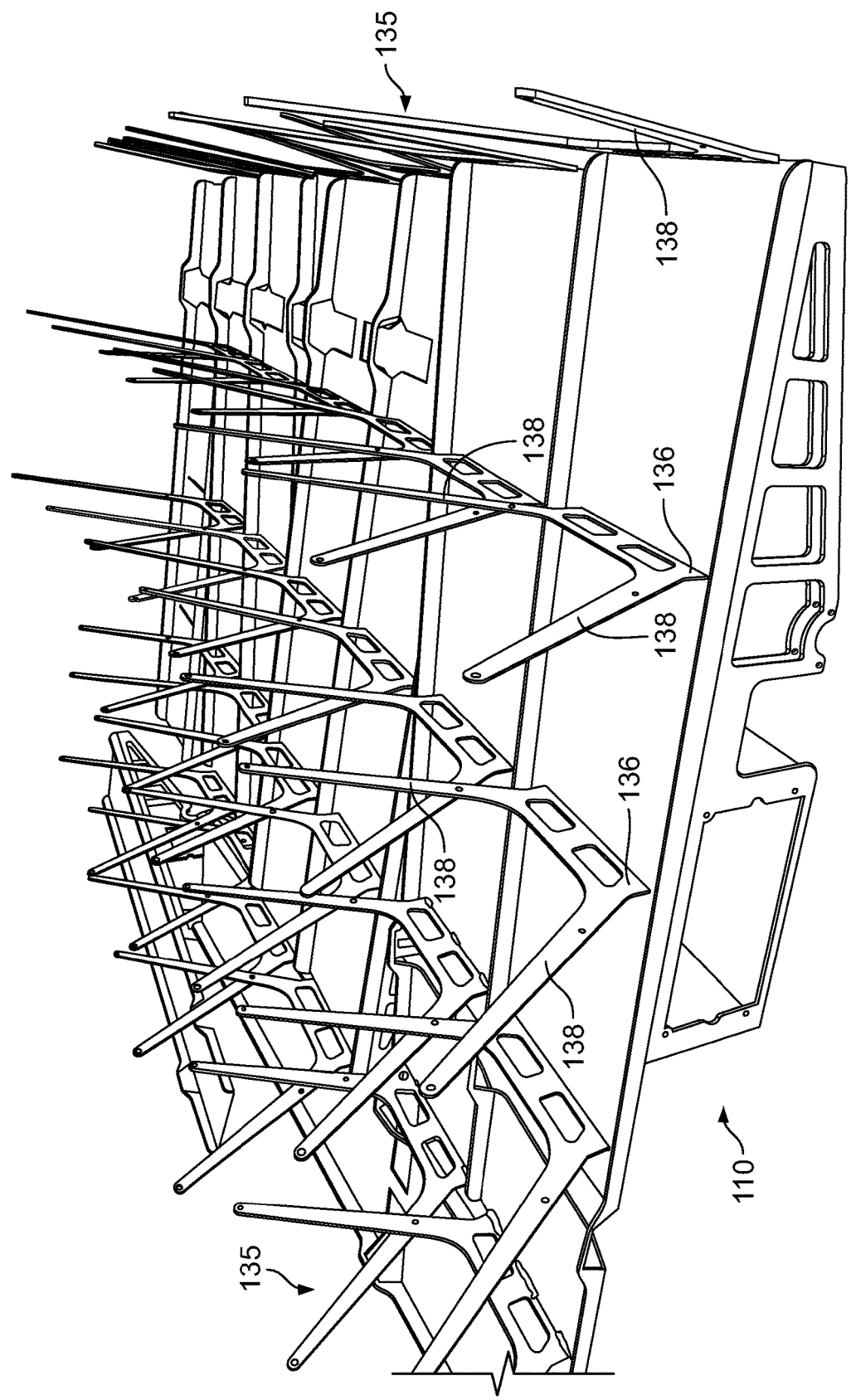
FIG. 18 is a perspective view of the lower assembly of FIG. 17 having support members attached thereto.

Exemplary structural support members 135 are shown in FIG. 18. Structural support member 135 includes an attachment portion 136 configured to be received into a slot 132 for securely retaining the support member 135 therein. Support member 135 includes two arms 138 extending upwardly from attachment portion 136 thereof. Although support member 135 is shown as a single, unitary attachment having two extending arms, it is contemplated that two separate structures could instead be used, each received within the same slot 132 or into separate slots.

Whether extending from a single structure or more than one structure, arms 138 extend upward from lower platform 112 to provide a framework and attachment points for other structure of lug transport 100, as described below.

Figure 20:
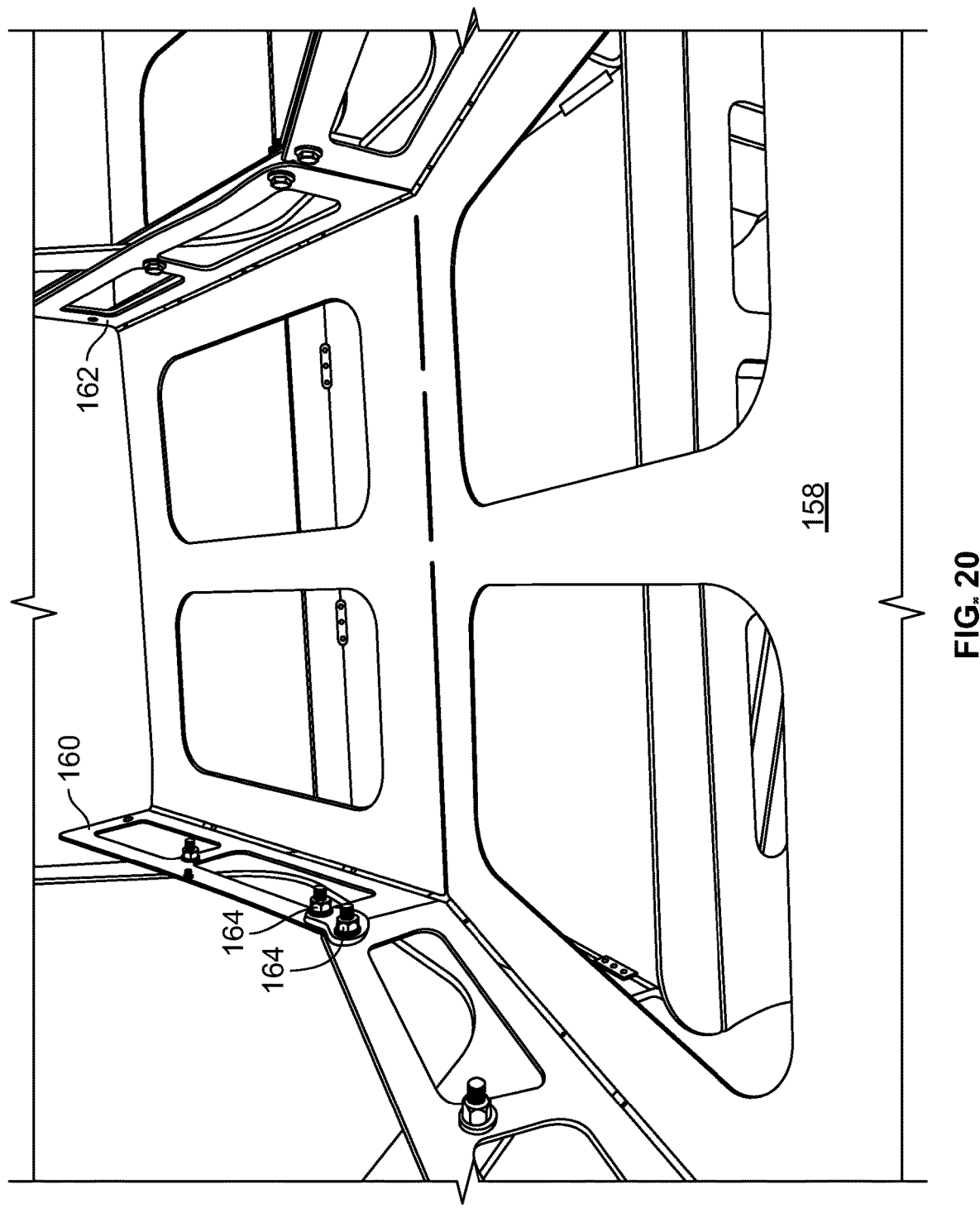
FIG. 20 is a close perspective view of components of the lug transport of FIG. 16 defining storage spaces associated therewith.

FIG. 19 is a side view of lug transport 100. Lower assembly 110 is shown, and mounted on lower platform 112 are structures defining a plurality of storage spaces 156. Each storage space 156 is defined by a base 158, first side wall 160, and second side wall 162. Adjacent side walls are attached to one another with fasteners 164, which also attach the respective sidewall to an arm 138. The lug transport 100 shown in the figure has sixteen storage spaces, eight storage spaces defined on an upper portion of lug assembly 100 and eight defined below. The components are shown from another angle in FIG. 20.

Although a variety of power configurations may be used with the devices of the present disclosure, one embodiment of a lug transport may utilize a 36-volt operating system. Such a lug transport may utilize three batteries wired in series to achieve the target 36-volts. A motor may operate at 1000 watts, at 36 volts, to provide a normal amperage draw of 27 amps, under normal load. A 70 amp controller may be provided to push the motors under heavy load. The 36 volt system allows for utilization of a gear ratio of 24:1, which provides sufficient rotational speed and torque to drive 16-inch tires and achieve the load parameters desired for the lug transport. In one embodiment of a lug transport, a Curtis 1228 36-volt controller is utilized along with an ASI Viking transaxle, a 1000 watt motor geared 24:1, and 16 inch tires. Such a transport may achieve speeds of up to 3 mph, or may run slower than that because of the torque available from the speed at which the motor runs. The lower amperage draw results in lower heat production, allowing for longer run times and the use of lower-cost batteries.

It is contemplated that the size and number of defined storage spaces may vary according to the needs of a user, who may detach and affix variously-sized sidewall and base portions according to the number and size of lugs to be transported. The length and placement of arms 138 may also be varied to provide a variety of storage space sizes and numbers. It is contemplated that differently sized or shaped storage spaces may be provided on the same lug transport 100.

The foregoing description of the devices of the present disclosure, and the accompanying drawings, are exemplary and are intended to illustrate the principles of the present disclosure. The description and drawings are not intended to limit the spirit or scope of this disclosure.

The invention claimed is:

1. A lug transport comprising:
   a lower assembly comprising a frame having an upper end and a lower end;
   an upper assembly attached to the upper end of the lower assembly, wherein the upper assembly comprises a first longitudinal side and a second longitudinal side, and wherein a first plurality of storage spaces is defined from the first longitudinal side of the upper assembly to a longitudinal center of the upper assembly, and further wherein a second plurality of storage spaces is defined from the second longitudinal side of the upper assembly to the longitudinal center of the upper assembly;
   a plurality of dividers extending between one of said first plurality of storage spaces and one of said second plurality of storage spaces;
   a bottom plate extending along the longitudinal center of the upper assembly at a bottom of said upper assembly, wherein the bottom plate is removably attachable to the lower assembly of said lug transport;
   at least one wheel rotatably attached to the lower end of the rear end of the lower assembly for allowing the lug transport to travel along a surface; and
   a caster assembly attached to a front end of the lower assembly, wherein the caster assembly comprises a second wheel and further wherein the caster assembly is freely rotatable around an axis perpendicular to a horizontal plane of the lower assembly,
   wherein said storage spaces are sized and shaped to receive an agricultural lug, and further wherein said storage spaces are configured to prevent sliding of said agricultural lug when disposed within said storage space.

2. A lug transport comprising:
   a lower assembly comprising a frame having an upper end and a lower end;
   an upper assembly attached to the upper end of the lower assembly, wherein the upper assembly comprises a first longitudinal side and a second longitudinal side, and wherein a first plurality of storage spaces is defined from the first longitudinal side of the upper assembly to a longitudinal center of the upper assembly, and further wherein a second plurality of storage spaces is defined from the second longitudinal side of the upper assembly to the longitudinal center of the upper assembly;
   a plurality of dividers extending between one of said first plurality of storage spaces and one of said second plurality of storage spaces;
   a bottom plate extending along the longitudinal center of the upper assembly at a bottom of said upper assembly;
   a center support extending along the longitudinal center of said upper assembly at a top of said upper assembly, wherein the bottom plate of a first upper assembly is attachable to a center support of a second upper assembly;
   at least one wheel rotatable attached to the lower end of the rear end of the lower assembly for allowing the lug transport to travel along a surface; and
   a caster assembly attached to a front end of the lower assembly, wherein the caster assembly comprises a second wheel and further wherein the caster assembly is freely rotatable around an axis perpendicular to a horizontal plane of the lower assembly,
   wherein said storage spaces are sized and shaped to receive an agricultural lug, and further wherein said storage spaces are configured to prevent sliding of said agricultural lug when disposed within said storage space.

* * * * *